United States Patent [19]
Sakamoto et al.

[11] Patent Number: 5,903,762
[45] Date of Patent: May 11, 1999

[54] APPLICATION EXECUTION METHOD AND SYSTEM THEREFOR

[75] Inventors: Kazuhiko Sakamoto, Kawasaki; Masasuke Tominaga, Sagamihara; Tetsuya Masuishi, Machida; Matsuki Yoshino, Yokohama, all of Japan

[73] Assignee: Hitachi, Ltd., Tokyo, Japan

[21] Appl. No.: 08/851,061

[22] Filed: May 5, 1997

[30] Foreign Application Priority Data

May 9, 1996 [JP] Japan ................... 8-114784

[51] Int. Cl.$^6$ ............................................. G06F 9/45
[52] U.S. Cl. ................................................ 395/712
[58] Field of Search ........................... 395/712, 701, 395/702, 703, 704, 705, 708, 202, 200.59, 500; 705/26

[56] References Cited

U.S. PATENT DOCUMENTS

| | | | |
|---|---|---|---|
| 5,557,775 | 9/1996 | Shedletsky | 395/500 |
| 5,694,546 | 12/1997 | Reisman | 705/26 |
| 5,771,354 | 6/1998 | Crawford | 395/200.59 |
| 5,822,544 | 10/1998 | Chaco et al. | 395/202 |

*Primary Examiner*—Tariq R. Hafiz
*Assistant Examiner*—Peter J. Corcoran, III
*Attorney, Agent, or Firm*—Antonelli, Terry, Stout & Kraus, LLP

[57] ABSTRACT

A client computer obtains an execution file name of an application to be started from the constitution file information thereof and notifies the application distribution request information to a server computer and upon receipt of it, the server computer obtains the execution file name of the application, distributes a file constituting the application to the client computer when the client computer is registered in the license information, decides whether the distribution of the application succeeds or not from the notification result, and starts the application by the client computer. By doing this, generation and use of an application program are realized in the same development environment and even if an application in the client computer is updated at the start of the application, an application requested to the client computer from the server computer can be set up automatically and remotely.

13 Claims, 15 Drawing Sheets

FIG. 4

```
< HTML >
< HEAD >
< TITLE > APPLICATION LIST </TITLE >
</HEAD >
< BODY >
APPLICATION LIST
< UL >
< L1 >< A HREF= "http://123.456.78.9 / LuncherFiles / TextEdit / TextEdit. Inc" > Text Editor</A >< BR >
< L1 >< A HREF= "http://123.456.78.9 / LuncherFiles / DrawEdit / DrawEdit. Inc" > DRAWING SOFT</A >< BR >   ⎫ 301
</UL >
</BODY >
</HTML >
```

FIG. 7
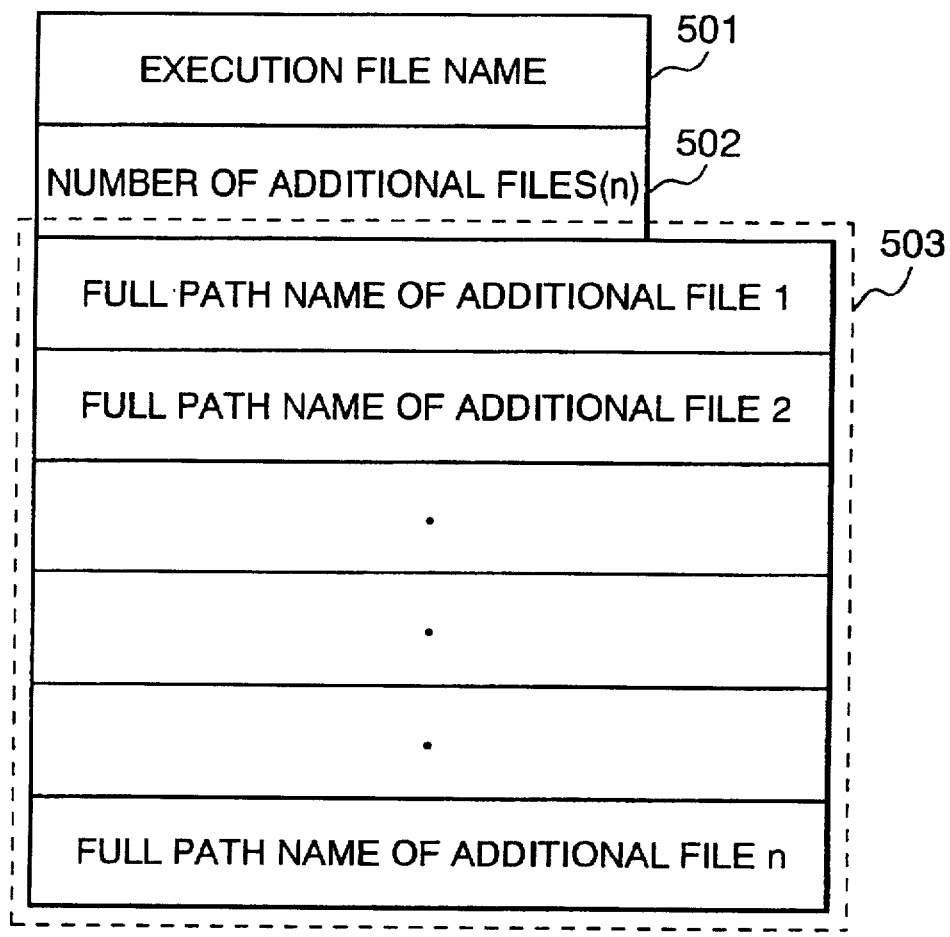
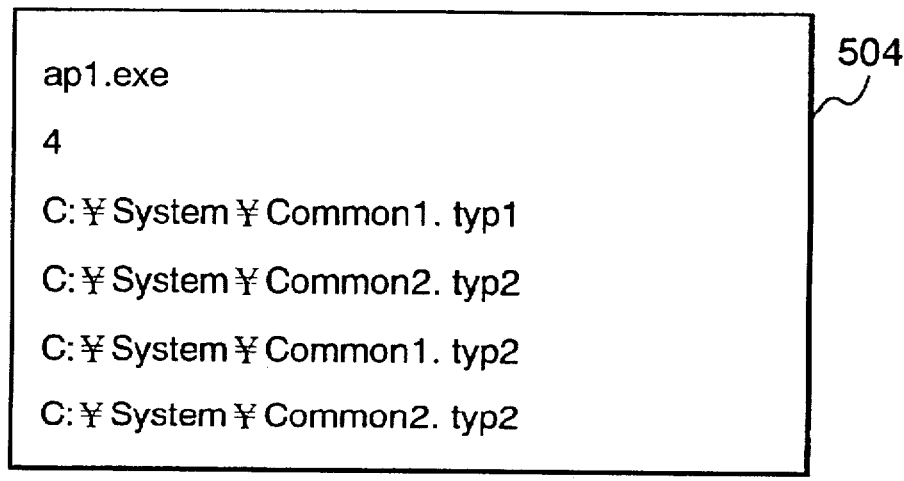

Client 1

456. 789. 12. 3

UPDATE

C:¥Ap1

Ap1. exe, 95/12/24, 09:09:09

4

C:¥System¥Common1. typ1, 95/12/20, 10:10:10

C:¥System¥Common2. typ1, 95/12/20, 11:11:11

C:¥System¥Common1. typ2, 95/12/20, 12:12:12

C:¥System¥Common2. typ2, 95/12/20, 13:13:13

FIG. 14

| NAME OF EXECUTION FILE 1 | , | DATE OF EXECUTION FILE 1 | , | TIME OF EXECUTION FILE 1 |
|---|---|---|---|---|
| . | , | . | , | . |
| . | , | . | , | . |
| . | , | . | , | . |
| NAME OF EXECUTION FILE n | , | DATE OF EXECUTION FILE n | , | TIME OF EXECUTION FILE n |

901 NUMBER OF REGISTERED APs (n)
902
903
904 905 906 907

908

3
AP1. exe, 95/12/24, 07:07:07
AP2. exe, 96/01/01, 01:01:01
AP3. exe, 95/02/02, 02:02:02

FIG. 15
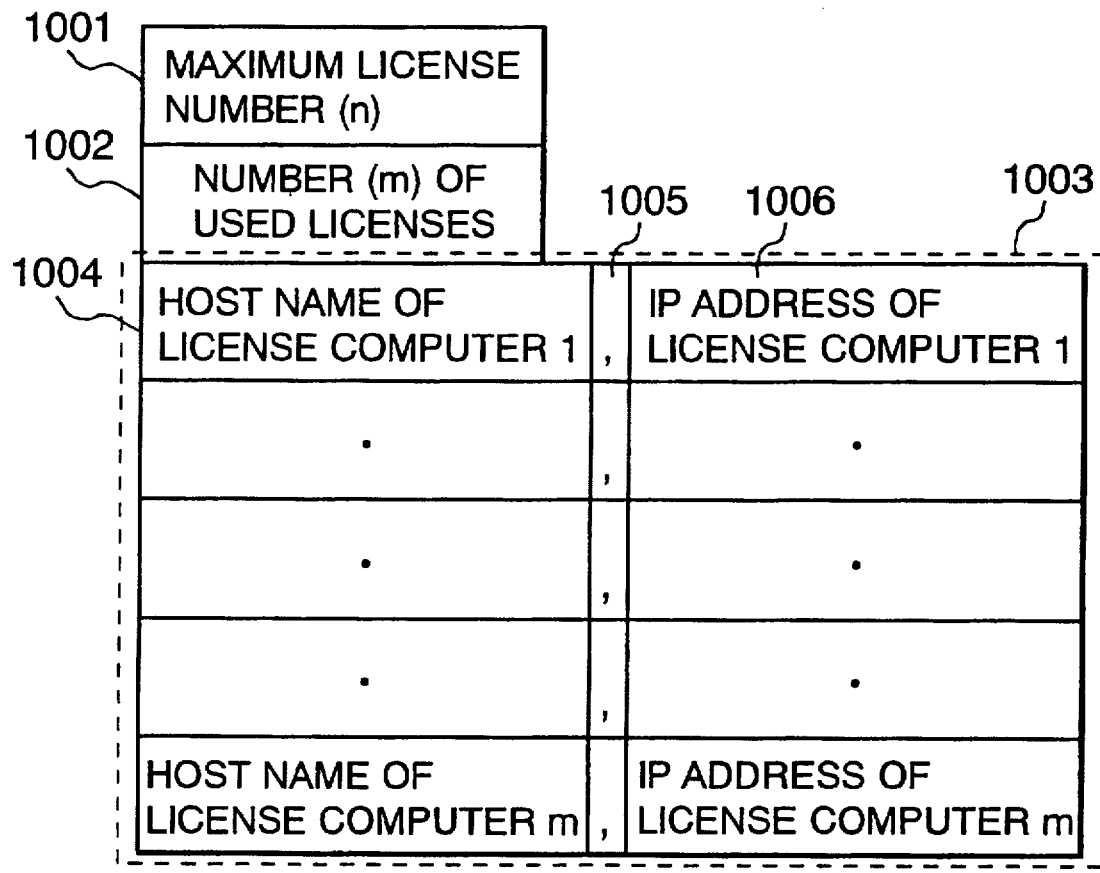
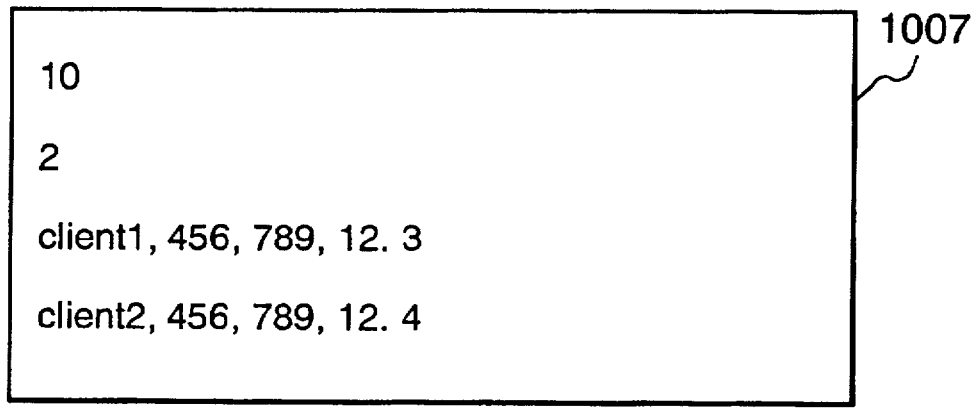

APPLICATION EXECUTION METHOD AND SYSTEM THEREFOR

BACKGROUND OF THE INVENTION

1. Field of the Invention

The present invention relates to an application execution method and a system therefor for executing an application program by automatically downloading files necessary for execution of the application program on demand from a server computer via a network when a client computer requests them to the server computer at the start of the application.

2. Description of the Prior Art

When an application program (hereinafter abbreviated to an application) is conventionally executed, it is a general method to designate an execution file which is set up (installed) in a client computer or an execution file stored in a computer connected to a cliend computer via a network and start it. However, it is possible that applications set up in all computers connected to the network are not of a latest edition with everything provided. For example, there is a case that a latest edition is set up in a computer A, and an old edition is set up in a computer B, and on the other hand, nothing is set up in a computer C.

As a method for solving this problem, for example, there is a software automatic distribution system disclosed in Japanese Laid-Open Patent Application 7-334436. This system comprises a load detection device for detecting a power stop of a terminal computer and an overload or failure of a network, a split device for splitting software in transmission units, a transmission possibility decision device for deciding whether transmission is possible or not, a host computer having a transmission device, an intermediate host computer having a connection device and a reception device additionally in the aforementioned function device which is connected to the network via the host computer, and a terminal computer connected to the intermediate host computer via the network. By the aforementioned software automatic distribution system, processes are performed as indicated below.

(1) Applications are all managed by a server computer. Therefore, the server computer distributes the latest edition or an old edition regardless of a client computer.

(2) When an application is changed, the new application is automatically distributed to the client computer from the server computer. Therefore, when the application of the server computer is not changed even if only the application of the client computer is changed, the changed application will not be distributed.

(3) When the client computer is not turned on yet or an error is found in distribution of an application, the server computer manages the application distribution status by a table, retries the distribution until the distribution becomes possible, and maintains the distribution status.

(4) The distributed application should be set up at the client computer. The server computer only distributes an application, but not installs it.

As mentioned above, there are the following problems imposed in the prior art.

The first problem is that even if an application is updated, a distribution process for the updated application must be performed by the server computer to use the application.

The second problem is that even if an application necessary for the client computer exists, if the application is not registered in the server computer, it will not be distributed.

The third problem is that if even an application which is not required any longer by the client computer is registered in the server computer, it will be distributed regardless of it. For example, even if a client computer A requires applications X and Y, if the applications X, Y, and Z are registered in the server computer, these three applications are distributed.

The fourth problem is that when an application is distributed from the server computer, it is necessary to set up it at the client computer. That is, software to be distributed is only an installation program for setting up, so that only when the client computer executes the installation program, it can be used.

SUMMARY OF THE INVENTION

The objective of the present invention is to solve all these conventional problems and to provide an application execution method and a system therefor for requesting distribution of applications registered in a server computer at the start of an application in a client computer and when the application is updated, automatically distributing the necessary updated application to the client computer.

Users can be released from knowing the relationship between computers and distributed applications in the computers. Users can devote themselves just to use applications without taking account of the status of the distribution.

The present invention is an application execution method and a system therefor in a system for distributing an application program to a client computer from a server computer via a transmission line and executing it by the client computer, wherein the process by the client computer presents a down load request of at least one file among files stored in a file system of the server computer, receives a down load of the request file from the server computer, decides the down-loaded file, analyzes the down-loaded request when the down-loaded file agrees with the request file as a result of the decision, decides the execution file of the application to be started which is described in the request file on the basis of the analytical result, and notifies the distribution request of the execution file of the application to the server computer.

The process by the server computer interprets a command relating to the distribution request received from the client computer, decides whether the application whose distribution is requested is licensed in the client computer or not, and sets up the application in the client computer when the application is licensed as a result of the decision.

In the application execution method of the present invention, (1) the client computer (101 shown in FIG. 1) comprises a step of presenting a download request (113 shown in FIG. 1) of files stored in the file system (108 shown in FIG. 2) of the aforementioned server computer (102 shown in FIG. 2) firstly and down loading the request file from the server computer, a step (402 shown in FIG. 5) of deciding if the download is successful or not, analyzing the down-loaded request file (119 shown in FIG. 1) when the download is successful (114 shown in FIG. 1), and obtaining the execution file name of the application to be started which is described in the file, and a step (420 shown in FIG. 6) of notifying a set of distribution request of the execution file of the application to the server computer (118 shown in FIG. 1) and the server computer comprises a step of interpreting a command (603 shown in FIG. 8) of the received distribution request and deciding whether the distribution-requested application is set up in the server computer or not (803 shown in FIG. 12) and whether it is licensed in the client computer or not (803 shown in FIG. 13) and a step (717 shown in FIG. 10, 720 shown in FIG. 11) of setting up the application in the client computer remotely when it is licensed as the result of the decision (803).

Furthermore, (2) the client computer (101 shown in FIG. 1) obtains the execution file name of the application to be started from the constitution file information (402 shown in FIG. 5), decides whether the application is set up in the client computer or not from the execution file name (403 shown in FIG. 5), sets distribution request information of the application, and then notifies the distribution request information to the server computer (420 shown in FIG. 6), and the server computer (102 shown in FIG. 2) obtains the execution file name of the application which is an object of distribution request from the distribution request information notified from the client computer (802 shown in FIG. 12), decides whether the obtained execution file name is registered in the application registration information for managing applications registered in the server computer from the execution file name (803 shown in FIG. 12), distributes files constituting the application to the client computer (720 shown in FIG. 11) when the client computer is registered in the license information of the server computer (717 shown in FIG. 10), and notifies the distribution result to the client computer (422 shown in FIG. 6), and the client computer decides whether the application distribution is successful or not from the notification result (421 shown in FIG. 6), displays a message on success or failure of the distribution on the client computer from the decision result (423 shown in FIG. 6), and starts the distributed application (424 shown in FIG. 6).

The foregoing and other objects, advantages, manner of operation and novel features of the present invention will be understood from the following detailed description when read in connection with the accompanying drawings.

BRIEF DESCRIPTION OF THE DRAWINGS

FIG. 4 is a drawing showing a script example of the browser process 103 and the file I/O process 106 shown in FIGS. 1 and 2.

FIG. 7 is a schematic view showing a luncher file example of the present invention.

FIG. 9 is another part of the schematic view showing the same distribution request instruction set example.

FIG. 14 is a schematic view showing an AP registration file example of the server computer A of the present invention.

FIG. 15 is a schematic view showing a license file example of the server computer of the present invention.

DETAILED DESCRIPTION OF THE PREFERRED EMBODIMENTS

The embodiments of the present invention will be explained in detail hereunder with reference to the accompanying drawings.

Figure 1:
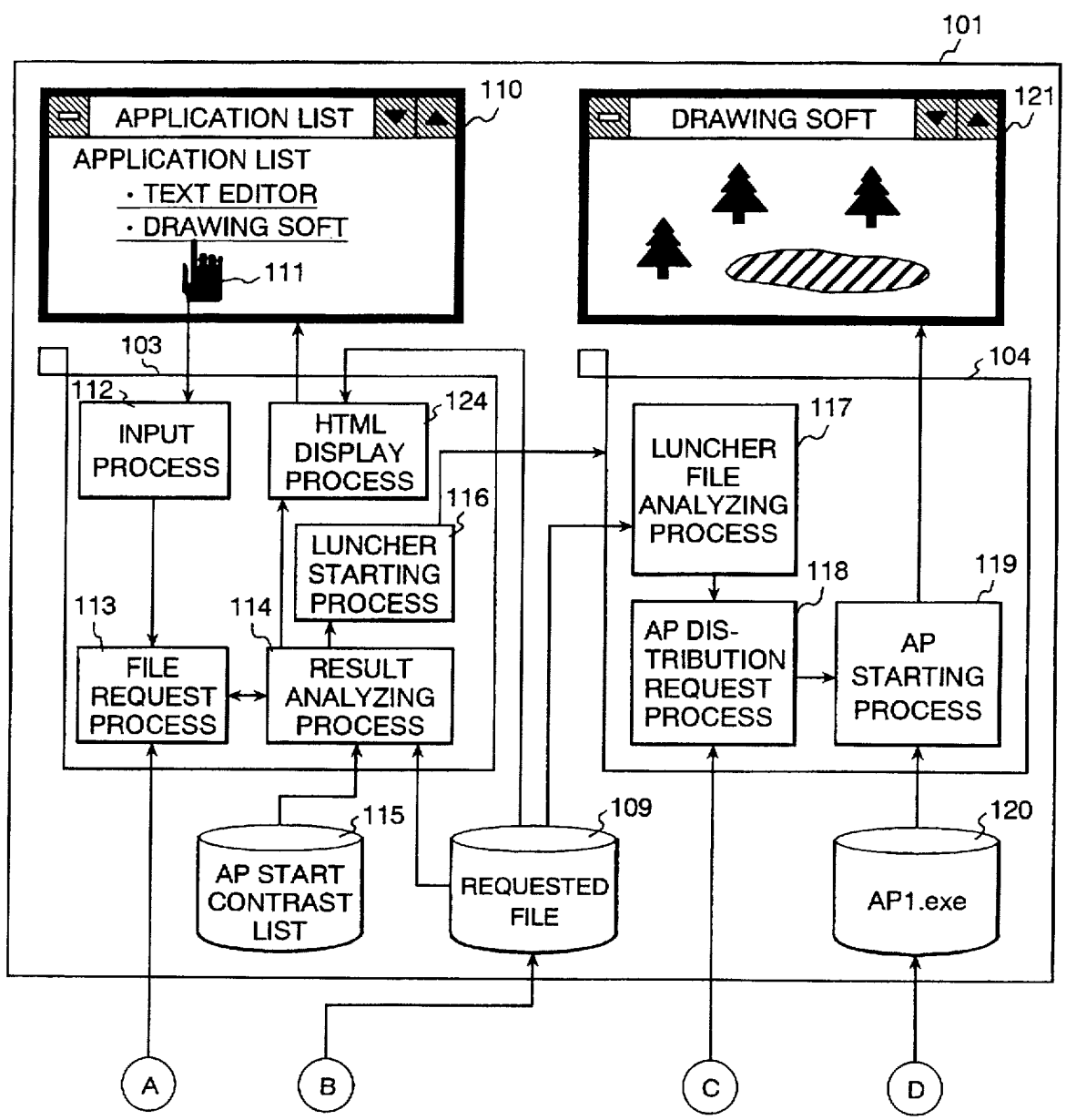
FIG. 1 is a part of a block diagram of the process constitution showing an embodiment of the present invention.
Figure 2:
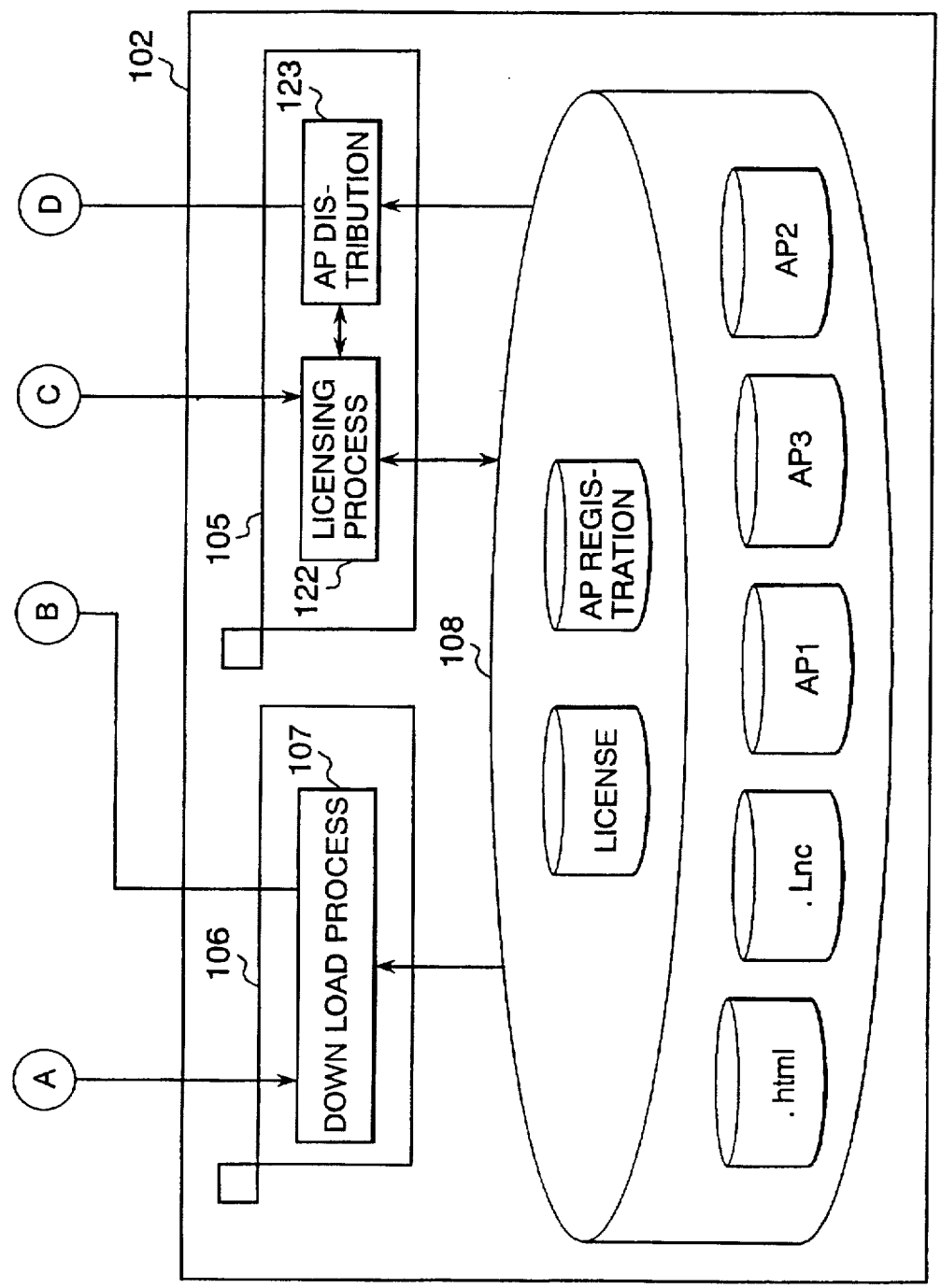
FIG. 2 is another part of the block diagram of the same process constitution.

FIGS. 1 and 2 show process block diagrams of a program execution system to which the present invention is applied.

The program execution system of the present invention comprises a browser process 103 executed by a client computer 101, an application starting process 104 in the client computer 101 which is called from the browser process 103, a file I/O process 106 for down-loading a file of a server computer 102, and an application management process 105 for distributing an application (for example, AP1) of the server computer 102. The server computer 102 is provided with various applications (AP1, AP2, AP3) and data files (html, Lnc), a license for permitting use of the applications, and a file system 108 for storing the registration numbers of the applications.

There are an input process 112, a file request process 113, an HTML display process 124, a luncher starting process 116, and a result analyzing process 114 in the browser process 103. The application starting process 104 is provided with a luncher file analyzing process 117, an AP distribution request process 118, and an AP starting process 119.

Firstly, communication between the browser process 103 of the client computer 101 and the file I/O process 106 of the server computer 102 will be explained by use of the process constitutions shown in FIGS. 1 and 2, the processing flow shown in FIG. 3, and the script shown in FIG. 4.

Information transfer between the browser process 103 and the file I/O process 106 is roughly carried out in the following order.

Step 1: The file request process 113 of the browser process 103 notifies the down load request of a file stored in the file system 108 of the server computer 102 to the file I/O process 106.

Step 2: The down load process 107 of the file I/O process 106 retrieves the file to be down-loaded from the file system 108, obtains the file, and then down-loads it as a request file 109 for the client computer 101.

Step 3: The browser process 103 displays the down-loaded request file 109 on a browser screen 110.

After the browser process 103 displays the file on the screen, it passes the process to the application starting process 104 and obtains the execution file name of the application which is started by the application starting process 104 after opening the file and then information transfer with the application management process 105 is started.

As mentioned above, the browser process 103 requests a file to the down load process 107 and then the application starting process 104 requests an application for controlling the file to the application management process 105.

Figure 3:
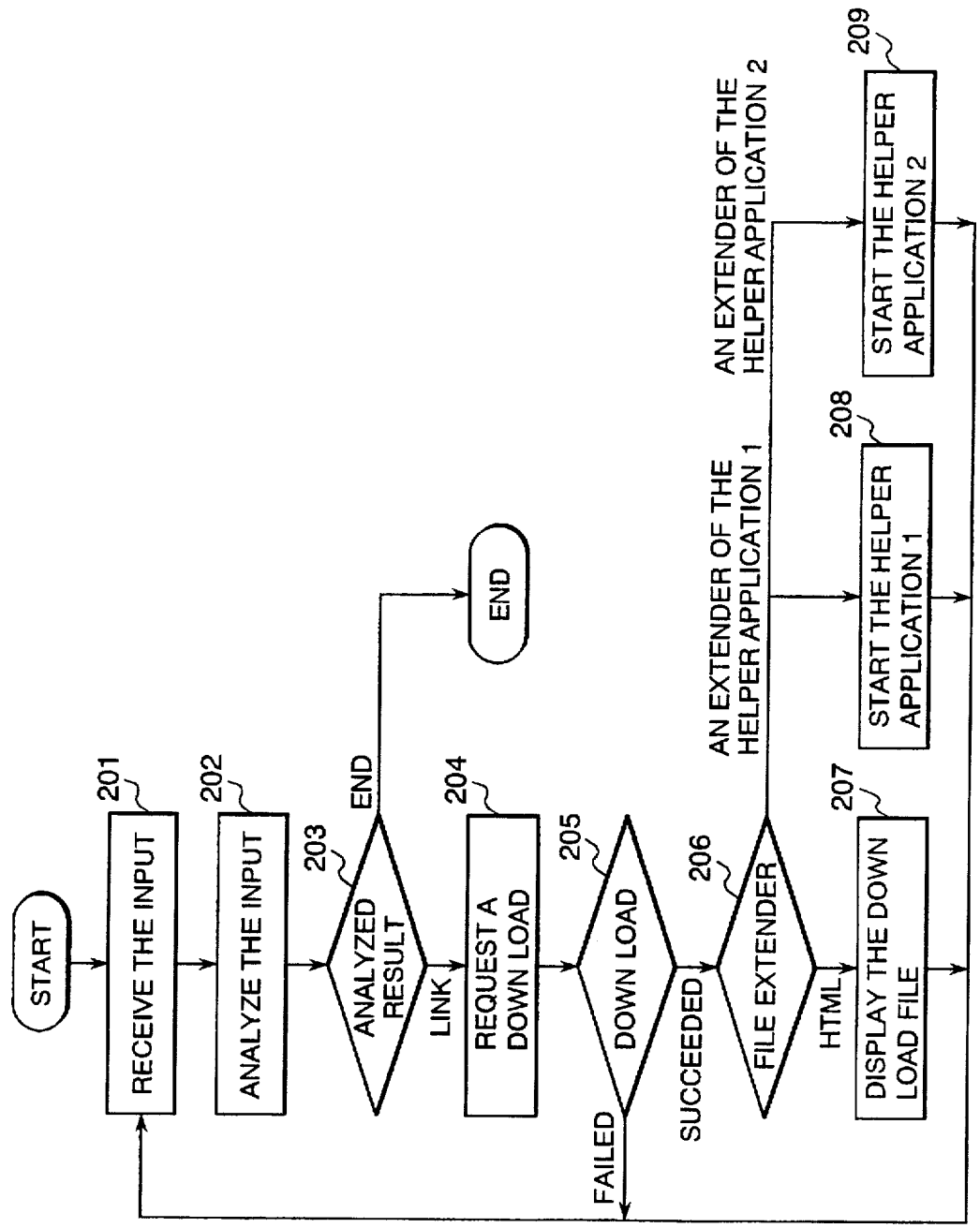
FIG. 3 is a process flow chart including information transfer between the browser process (103) and the file I/O process (106) shown in FIGS. 1 and 2.

FIG. 3 is a flow chart showing information transfer between the browser process 103 and the file I/O process 106, which shows the aforementioned rough flow (Steps 1 to 3) in detail.

FIG. 4 is a drawing showing the script displayed on the browser screen (110) shown in FIGS. 1 and 2.

A process 201 is an input reception process of the input process 112 shown in FIGS. 1 and 2. Firstly, the scrip shown in FIG. 4 is displayed on the browser screen 110 by the client computer 101 and a character, figure, photograph, etc. are specified from the list by clicking 111 by the mouse. As an example thereof, drawing software is specified in FIGS. 1 and 2.

As shown in FIG. 4, the browser process 103 reads the HTML (hyper text markup language) shown in FIG. 4 and displays it on the browser screen 110. When the displayed character, figure, and photograph, etc. are clicked by the mouse, information defined for the clicked character, figure, photograph, etc. is displayed on the browser screen 110. In FIG. 4, the HTML corresponding to the clicking 111 shown in FIGS. 1 and 2 conforms to a text 301.

The script is described in the HTML developed on the basis of the SGML (standard generalized markup language) corresponding to the protocol developed by the CERN (the European Laboratory for Particle Physics) (for details of the HTML, refer to ISBN 4-7952-5071-5 C2055, date of issue Nov. 15, 1995, publisher Riburosu Inc., author Sachi, document name "First HTML 3.0").

Step 202 is an analyzing process of the input process 112. Step 202 analyzes the specified input information as a result of analysis and decides the process of the browser process 103.

Step 203 is a distribution process of the input process 112 and distributes the process to be called next to link and end from the analyzed result. When the analyzed result is ending of the browser process 103, Step 203 ends this flow. When the analyzed result is the down load process for a file, Step 203 calls Step 204.

Step 204 is a down load request process of the file request process 113. Step 204 notifies the down load request of the file obtained from the analyzed result to the file I/O process 106 for the server computer 102.

Step 205 is a process of deciding success or failure of the down load in the result analyzing process 114. Namely, the result analyzing process 114 decides the result down-loaded from the down load process 107 of the server computer 102. When the down load of the requested file succeeds, Step 205 calls Step 206. When it fails, Step 205 calls Step 201.

Step 206 is a process of deciding an extender (an extender of starting of helper applications 1 and 2 or down load file display) of the down-loaded request file 109 of the result analyzing process 114. In this case, Step 206 obtains the helper application name conforming to the extender of the request file 109 from an AP start contrast list 115 and calls the obtained helper application. With respect to the extender, for example, a photograph and a history are registered as separate extenders (helpers 1, 2) even in a file of the same name.

Step 207 draws the request file 109 obtained by the HTML display process again. Namely, since the down load from the server computer 102 succeeds, Step 207 draws the request file 109 sent thereby on the screen 110 again.

Step 208 starts by the helper application 1 obtaining the file down-loaded from the server computer 102 and passes control to Step 201.

Step 209 performs the same process as that of Step 208.

As explained above, when a character, figure, photograph, etc. displayed on the browser screen 110 are clicked by the mouse, it is made possible to draw the browser screen 110 again or to start a process by the helper applications.

Next, communication between the application starting process 104 of the client computer 101 and the application management process 105 of the server computer 102 shown in FIGS. 1 and 2 will be explained in detail.

The application starting process 104 requests an application program 120 using the file 109 down-loaded before to the application management process 105.

Firstly, the process of the application starting process 104 will be explained by the rough steps.

Step 1: When the extender is "inc" (luncher) as a process of deciding the extender of the result analyzing process 114, the application starting process 104 is called from the luncher starting process 116 as a helper application.

When the extender of the down-loaded file is "lnc", it is defined in the AP start contrast list 115 that the helper application "APEXE.EXE" (the application starting process 104) is started. Hereinafter, a file having an extender of "inc" is called a "LUNCHER file".

Step 2: The luncher file analyzing process 117 analyzes the down-loaded luncher file (request file 109) and obtains the execution file name of the application to be started which is described in the luncher file.

Step 3: The AP distribution request process 118 notifies a distribution request of the execution file (that is, application program) of the obtained application to the server computer 102.

Step 4: The AP starting process 119 starts the execution file 120 of the distributed application. A window 121 shown in FIGS. 1 and 2 is a drawing showing an output screen example of the started application.

Figure 5:
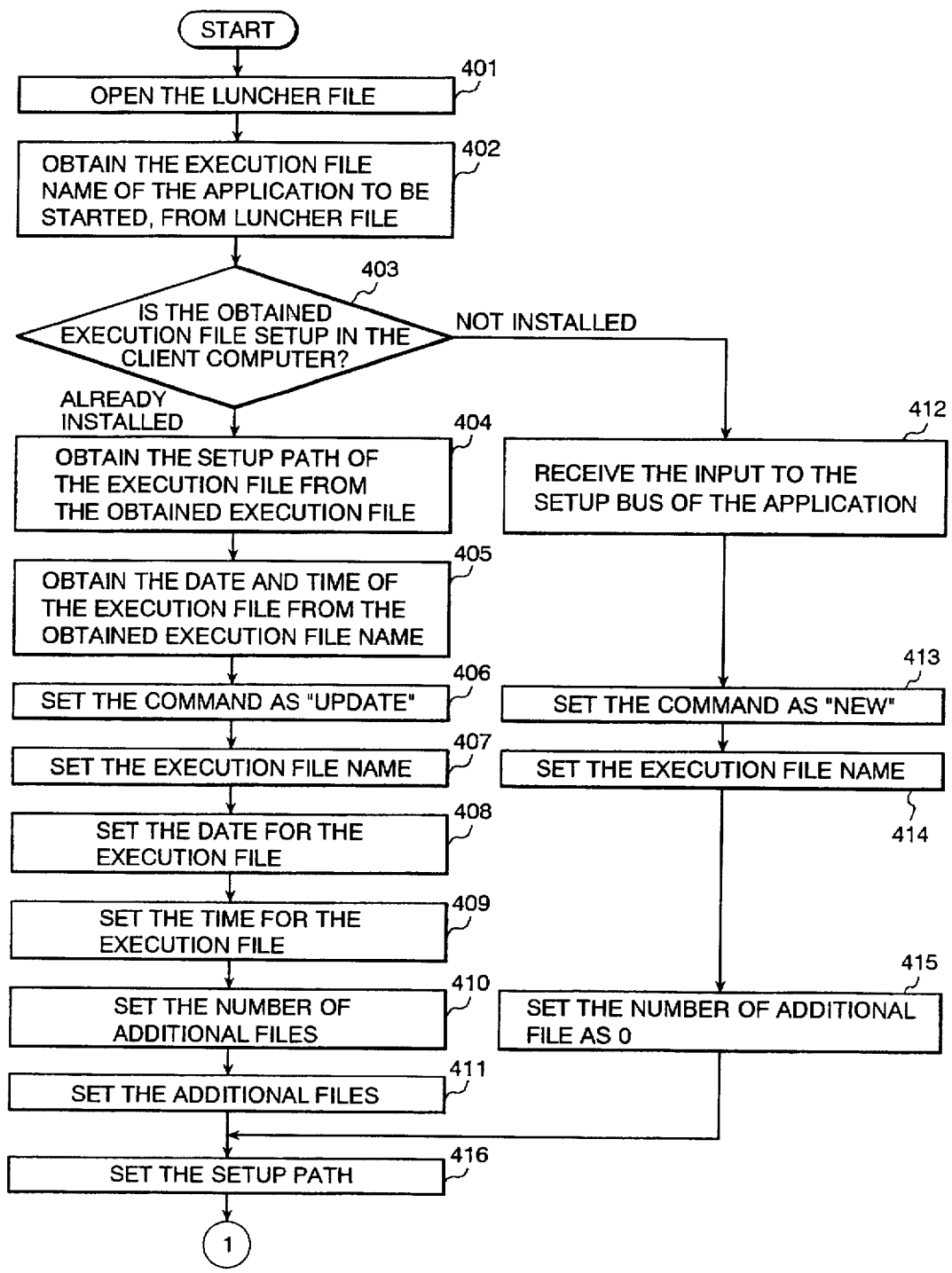
FIG. 5 is a part of a process flow chart of an application starting process (104) of the present invention.
Figure 6:
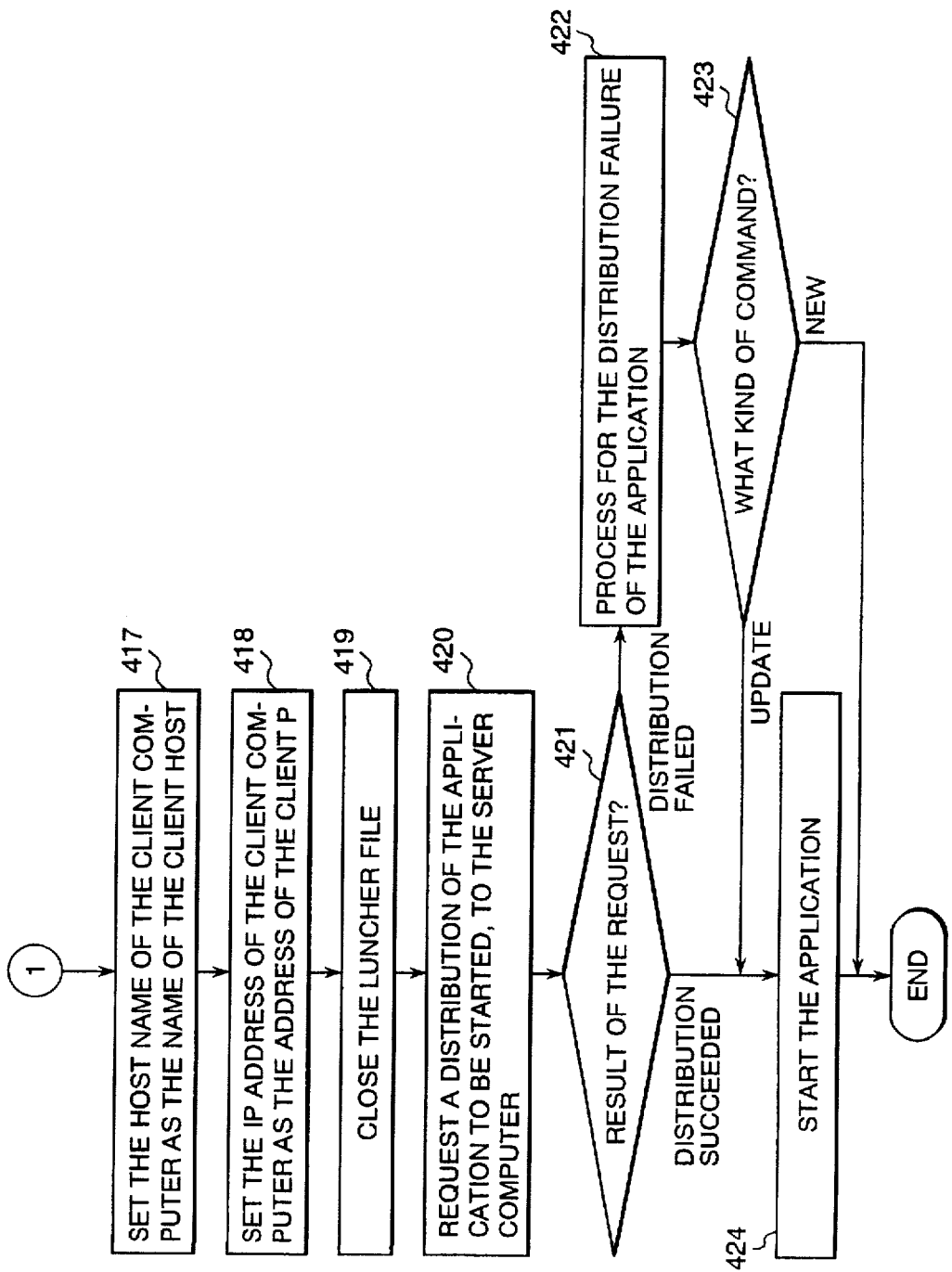
FIG. 6 is another part of the process flow chart of the same application starting process.

FIGS. 5 and 6 are process flow charts of the application starting process of the present invention.

FIG. 7 is a drawing showing an example of a luncher file.

The aforementioned steps (Steps 1 to 4) will be explained more in detail hereunder by use of the flow charts shown in FIGS. 5 and 6.

Step 401 opens the down-loaded luncher file (request file 109).

The luncher file comprises, as shown in FIG. 7, an application execution file name 501, a number of additional files 502, and a full path name list of additional file 503. The additional file is a library file necessary when the application execution file is started.

In a luncher file 504, an example that the application execution file name "apl.exe", a number of additional files "4", and the additional file full path name list "C:¥System¥Common1.typ1", "C:¥System¥Common2.typ1", "C:¥System¥Common2.typ1", and "C:¥System¥Common2.typ2" are set is displayed. In this case, the full path name list of additional file is the file name of the lowest layer of the tree structure constituting the file.

Step 402 obtains the application execution file name from the luncher file. In the case of the luncher file 504 shown in FIG. 7, the execution file name of the obtained application is "apl.exe".

Step 403 decides whether the execution file of the obtained application is set up in the client computer 101 or not. When it is set up, Step 403 calls Step 404. When it is not set up, Step 403 calls Step 412. Firstly, Step 404 to Step 411 will be explained.

Step 404 obtains an execution file setup path from the execution file name of the obtained application. The setup path is a tracing path down to the lowest layer of the tree structure constituting the execution file.

Step 405 obtains the date and time of the execution file from the execution file name of the obtained application. Whether the version modification is new or old can be seen from the date and time of the execution file.

Steps 406 to 414 are processes of setting an instruction set for requesting distribution of applications managed by the server computer 102. Firstly, a distribution request instruction set to be set will be explained and then Step 406 and the subsequent steps will be explained.

Figure 8:
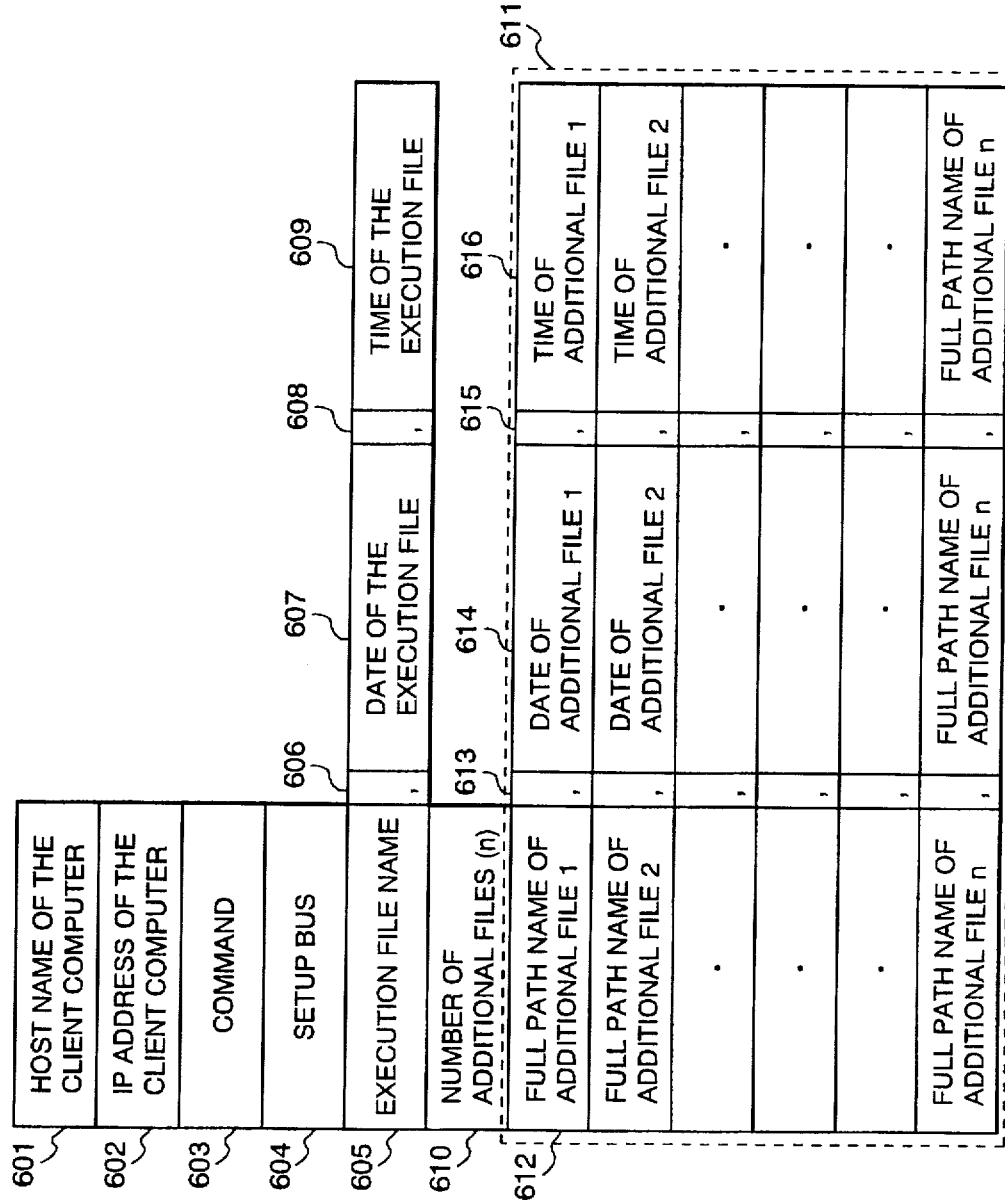
FIG. 8 is a part of a schematic view showing a distribution request instruction set example outputted from the application starting process (104) of the present invention.

FIGS. 8 and 9 are drawings of a distribution request instruction set showing an embodiment of the present invention.

The distribution request instruction set comprises, as shown in FIGS. 8 and 9, a client computer host name 601, a client computer IP address 602, a command 603, a setup path 604, an execution file name 605, a delimiter character 606, an execution file date 607, a delimiter character 608, an execution file time 609, a number of additional files 610, and a full path name list of additional file 611. The full path name list of additional file 611 comprises a full path name of additional file 612, a delimiter character 613, an additional file date 614, a delimiter character 615, and an additional file time 616.

Step 406 sets "UPDATE" in the command 603 shown in FIGS. 8 and 9. "UPDATE" means update setup. This indicates to notify the server that an application is installed already.

Step 407 sets the execution file name of the obtained application in the execution file name 605 of the distribution request instruction set shown in FIG. 6.

Step 408 sets the date of the execution file of the obtained application in the execution file date 607 of the distribution request instruction set.

Step 409 sets the time of the execution file of the obtained application in the execution file time 609 of the distribution request instruction set.

Step 410 sets the value of the number of additional files 502 of the luncher file in the number of additional files 610 of the distribution request instruction set.

Step 411 sets the full path name of additional file, date, and time set in the full path name list of additional file 503 of the luncher file in the full path name list of additional file 611 of the distribution request instruction set.

Next, Step 412 to Step 415 which are called from Step 403 will be explained. The processes of Step 412 to Step 415 are processes when the application execution file is not set up in the client computer 101.

Step 412 receives the input of the setup path of the application. Namely, Step 412 specifies the location for installation.

Step 413 sets "NEW" in the command 603 shown in FIGS. 8 and 9. "NEW" means new setup.

Step 414 sets the execution file name in the same way as Step 407.

Step 415 sets 0 in the number of additional files 610 of the distribution request instruction set for new setup.

Step 416 sets the obtained setup path in the setup path 604 of the distribution request instruction set.

Step 417 sets the host name of the client computer 101 in the host name 601 of the client computer of the distribution request instruction set.

Step 418 sets the IP address of the client computer 101 in the IP address 602 of the client computer of the distribution request instruction set.

With respect to Step 404 to Step 418, setting of a distribution request instruction set is explained.

In the above explanation, an example of a distribution request instruction set when the execution file of the application obtained in a distribution request instruction set 617 is set up in the client computer 101 is shown.

Next, Step 419 closes the open luncher file.

Step 420 notifies the set distribution request instruction set to the server computer 102 as a distribution request of the application to be started.

Step 421 decides whether the distribution request notified to the server computer 102 is satisfied or not. Namely, when the execution file of the requested application is sent, Step 421 judges that the request is satisfied. When it is not sent, Step 421 judges that the request is not satisfied.

Step 422 displays a message of a process for the distribution failure of the application on the screen.

If the command 603 is "NEW" when the distribution fails, there is no installed application available, so that Step 423 ends this flow. If the command 603 is "UPDATE" even if the distribution fails, there is an existing installed application though it is not newest, so that Step 423 calls Step 424.

Step 424 starts the execution file of the setup application. Needless to say, when the distribution succeeds, Step 424 starts the newest installed application and when it fails, Step 424 starts an old application.

The above is an explanation of the application starting process 104.

Next, when the client computer 101 notifies the distribution request at Step 420 shown in FIGS. 5 and 6, the application management process 105 of the server computer 102 is started.

Figure 10:
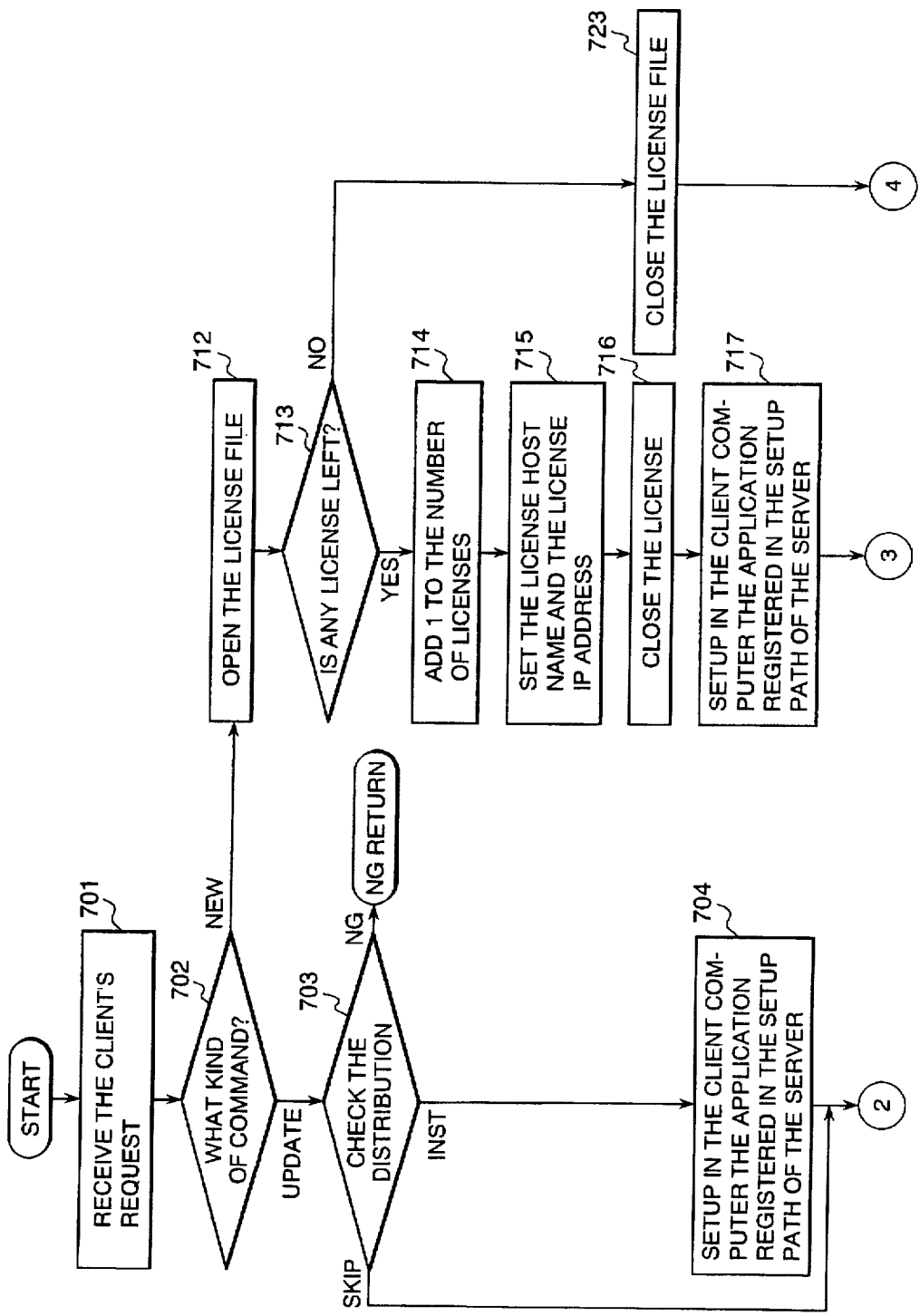
FIG. 10 is a part of a process flow chart of an application management process (105) of the present invention.
Figure 11:
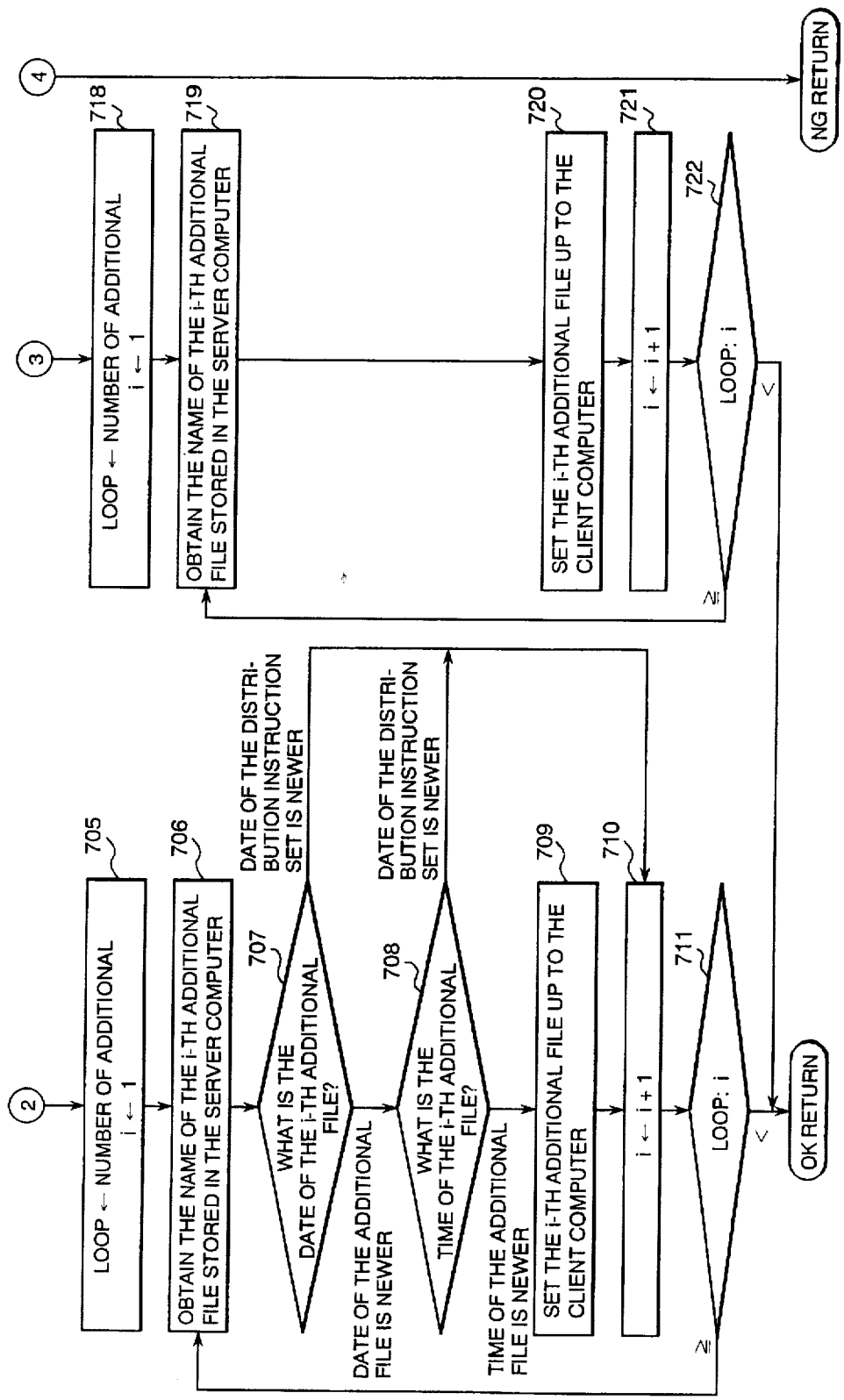
FIG. 11 is another part of the process flow chart of the same application management process.

FIGS. 10 and 11 are process flow charts of the application management process of the server computer of the present invention.

Before starting explanation of the flow shown in FIGS. 10 and 11, the rough process flow of the application management process 105 will be explained. The application management process 105 is realized by the following steps.

Step 1: The application management process 105 receives the distribution request of the application notified from the client computer 101 together with the distribution request instruction set.

Step 2: The application management process 105 decides the command of the distribution request instruction set.

Step 3: The licensing process 122 shown in FIGS. 1 and 2 decides whether the application whose distribution is requested is set up or licensed in the server computer 102. Licensing means permitting the computer to use the application.

Step 4: The AP distribution process 123 shown in FIGS. 1 and 2 sets up the application whose distribution is requested remotely in the client computer 101. By doing this, it is not necessary to set up the application by the client computer 101.

The aforementioned rough steps will be explained in detail hereunder by use of the flows shown in FIGS. 10 and 11.

Step 701 receives the distribution request from the client computer 101 together with the distribution request instruction set.

Step 702 decides the command 603 for distribution request. When the command is "UPDATE" (since the application is already distributed, a newest modified one is requested), Step 702 calls Step 703 and when it is "NEW" (since no application is distributed, a distribution is requested), Step 702 calls Step 712.

Step 703 decides whether the execution file of the application whose distribution is requested is managed by the server computer 102, or it is set up in the client computer requesting distribution, or the setup is skipped, or this flow ends. When the execution file is set up in the client computer, Step 703 calls Step 704 and when the setup is skipped, Step 703 calls Step 705. Skipping means a case that the application is not changed and only an additional file is changed. In this case, only the number of additional files is checked.

Figure 12:
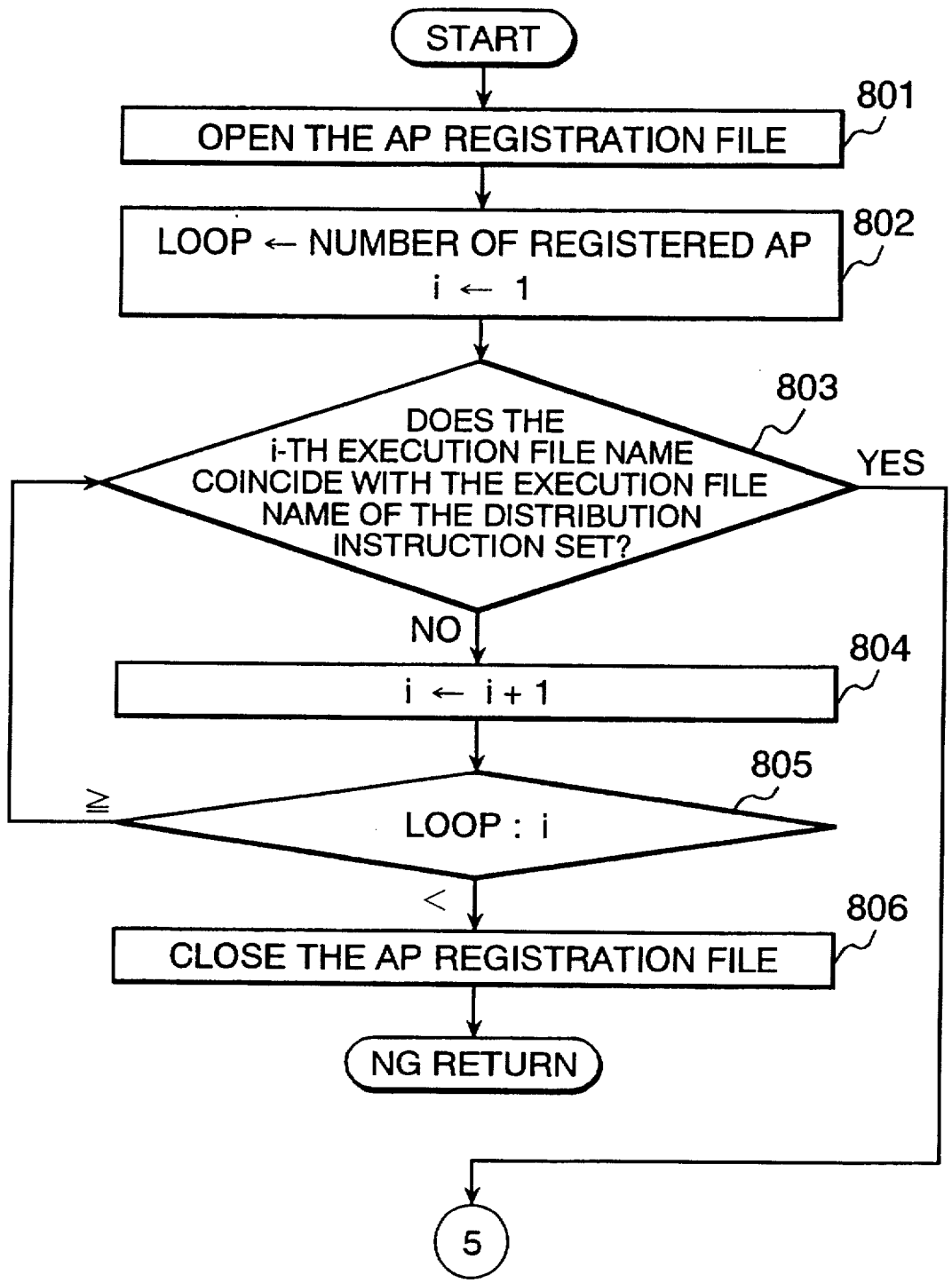
FIG. 12 is a part of a detailed flow chart of a distribution check process (703) among the processes of the application management process shown in FIGS. 10 and 11.
Figure 13:
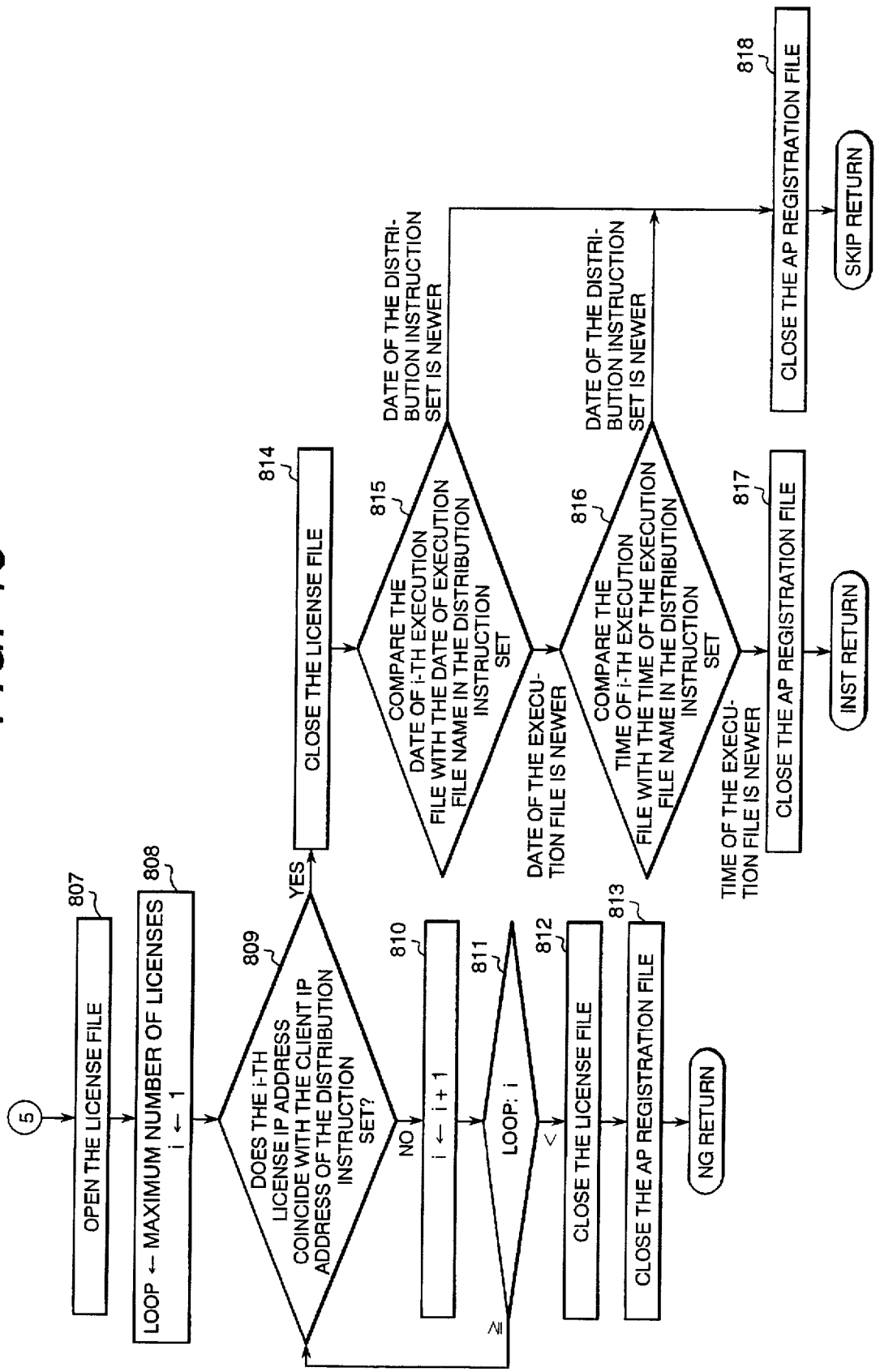
FIG. 13 is another part of the detailed flow chart of the same distribution check process.

FIGS. 12 and 13 are detailed flow charts of the distribution check process (703) shown in FIGS. 10 and 11 and FIG. 14 is a drawing showing an example of an AP registration file.

Step 801 opens the AP registration file. The AP registration file is a file for managing applications set up in the server computer 102.

The AP registration file comprises, as shown in FIG. 14, the number of registered applications 901 and an execution file name list 902. The execution file name list 902 comprises an execution file name 903, a delimiter character 904, an execution file date 905, a delimiter character 906, and an execution file time 907.

In an AP registration file 908, an example that a number of registered applications "4" and execution file name lists "AP1.exe,95/12/24,07:07:07", "AP2.exe,96/01/01, 01:01:01", and "AP3.exe,95/02/02,02:02:02" are set is shown.

Step 802 sets the value set in the number of registered applications 901 shown in FIG. 9 in the loop variable (variable that only the number of registered applications circulates) and 1 in the control variable i respectively.

Step 803 decides whether the i-th execution file name 903 of the execution file name list 902 of the AP registration file coincides with the execution file name 605 of the distribution request instruction set or not. If it does, Step 803 goes to Step 807 and if it does not, Step 803 calls Step 804. By doing this, Step 803 decides whether the requested application is registered or not.

Step 804 adds 1 to the control variable i.

Step 805 compares the value of the loop variable with the value of the control variable i. If the value of the loop variable is larger than or equal to the value of the control variable i, Step 805 goes to Step 803 and if it is smaller, Step 805 calls Step 806.

Step 806 closes the AP registration file and ends the processing of this flow on the assumption that the application whose distribution is requested is not registered.

Step 807 is a process when the application whose distribution is requested is registered. To decide whether there is a license in the client computer requesting distribution or not, Step 807 opens the license file.

FIG. 15 is a drawing showing a license file of the present invention.

The license file comprises a maximum number of licenses 1001, a number of used licenses 1002 indicating the number of licenses in use at present, and a host list of license computer 1003. The host list of license computer comprises a host name of license computer 1004, a delimiter character 1005, and an IP address of license computer 1006.

In a license file 1007, an example that a maximum number of licenses "10", a number of used licenses "2", and host lists of license computer "client1,456.789.12.3" and "client2,456.789.12.4" are set is shown.

In FIGS. 12 and 13 again, Step 808 sets the value of the maximum number of licenses 1001 in the loop variable and 1 in the control variable j respectively.

Step 809 decides whether the IP address 1006 of the i-th license computer of the host list 1003 of the execution license computer of the license file coincides with the IP address 602 of the client computer of the distribution request instruction set or not. If it does, Step 809 goes to Step 814 and if it does not, Step 809 calls Step 810.

Step 810 adds 1 to the control variable j.

Step 811 compares the value of the loop variable with the value of the control variable j. If the value of the loop variable is larger than or equal to the value of the control variable j as a result of comparison, Step 811 goes to Step 809 and if it is smaller, Step 811 calls Step 812.

Step 812 closes the license file. Namely, Step 812 closes the license file because no license is given.

Step 813 closes the AP registration file and ends the processing of this flow on the assumption that the application whose distribution is requested is not licensed.

On the other hand, Step 814 closes the license file on the assumption that a license is given because the address match occurs.

Step 815 compares the date 905 of the i-th execution file in the name list 902 of the execution file of the AP registration file shown in FIG. 14 with the date 607 of the execution file of the distribution request instruction set. Namely, Step 815 decides whether it is modified to a newest application or not. When the date 905 of the execution file is newer, the registered one is newer, so that Step 815 goes to Step 816. When the date 607 of the execution file is newer, a newest application is distributed to the client computer 101, so that Step 815 calls Step 818.

Step 816 compares the time 907 of the i-th execution file of the name list 902 of the execution file of the AP registration file with the time 609 of the execution file of the distribution request instruction set. When the time 907 of the execution file is newer, Step 816 goes to Step 817. When the time 609 of the execution file is newer, Step 816 calls Step 818.

Step 817 closes the AP registration file because the registered application is newer and ends the process of this flow on the assumption that the application whose distribution is requested is set up.

Step 818 closes the AP registration file for skipping because a newest application is also distributed to the client computer 101 and at least only the additional file is different. Step 817 ends the process of this flow on the assumption that the setup of the application whose distribution is requested is skipped.

The above is a detailed explanation of the distribution check 703 shown in FIGS. 10 and 11.

Next, the subsequent process flow shown in FIGS. 10 and 11 will be explained from Step 704 (installation process).

Step 704 sets up the application registered in the setup path 604 of the distribution request installation set of the server remotely in the client computer.

Step 705 sets the value of the number of additional files 610 of the distribution request instruction set in the loop variable and 1 in the control variable i for skipping.

Step 706 obtains the additional file name stored in the server computer 102 from the full path 612 of the i-th additional file of the full path name list 611 of the additional file of the distribution request instruction set.

Step 707 compares the date of the additional file obtained from the server computer 102 with the date 614 of the i-th additional file of the full name list 611 of the additional file of the distribution request instruction set. If the date of the additional file obtained from the server computer 102 is newer, Step 707 goes to Step 708 because the registered file is newest. If the date 614 of the i-th additional file of the full name list 611 of the additional file of the distribution request instruction set is newer, Step 707 calls Step 710 because the application distributed to the client computer 101 is newer.

Step 708 compares the time of the additional file obtained from the server computer 102 with the time 616 of the i-th additional file of the full name list 611 of the additional file of the distribution request instruction set. If the time of the additional file obtained from the server computer 102 is newer, Step 708 goes to Step 709. If the time 616 of the i-th additional file of the full name list 611 of the additional file of the distribution request instruction set is newer, Step 708 calls Step 710.

Step 709 sets up the additional file obtained from the server computer 102 remotely in the file full path of the i-th additional file of the full path name list 611 of the additional file of the distribution request instruction set.

Step 710 adds 1 to the control variable i. Namely, in comparison of the control variable i, the additional file of the application held by the client computer 101 is newer, so that Step 710 goes to comparison of the next additional file.

Step 711 compares the value of the loop variable with the value of the control variable i. If the value of the loop variable is larger than or equal to the value of the control variable i, Step 711 goes to Step 706 so as to repeat the same process and if it is smaller, Step 711 ends this flow assuming that the setup of the application succeeds because the additional file held by the client computer 101 is newer.

Next, a process which is called when the command 603 of distribution request at Step 702 is "NEW", that is, there is no distributed application in the client computer 101 will be explained.

Step 712 opens the license file so as to check whether the client computer 101 presenting the request is licensed.

Step 713 decides whether a new license can be issued or not. If the remainder when the number of used licenses 1002 is subtracted from the maximum number of licenses 1001 is 1 or more, a new license can be issued, so that Step 713 goes to Step 714. If it is 0, Step 713 calls Step 723 because a new license cannot be issued.

Step 714 adds 1 to the number of used licenses 1002.

Step 715 sets the host name 601 of the client computer of the distribution request instruction set in the host name 1004 of the license computer of the host list 1003 of the license computer and sets the IP address 602 of the client computer of the distribution request instruction set in the IP address 1006 of the license computer.

Step 716 closes the license file because a new license can be issued.

Step 717 performs the same process as that of Step 704. Namely, Step 718 sets the value of the number of additional files 610 in the loop variable and 1 in i.

Step 719 performs the same process as that of Step 706. Namely, Step 719 obtains the name of the i-th additional file stored in the server computer.

Step 720 is also the same as Step 709. Namely, since there is no distributed application in the client computer 101 in this case, Step 720 sets up the i-th additional file remotely in the client computer 101.

Step 721 is also the same as Step 710. Namely, Step 721 adds 1 to the control variable i.

Step 722 compares, in the same way as Step 711, the value of the loop variable with the value of the control variable i. If the value of the loop variable is larger than or equal to the value of the control variable i, Step 722 goes to Step 706 so as to repeat the same process and if it is smaller, Step 722 ends this flow assuming that the setup of the application succeeds because the additional file held by the client computer 101 is newer.

Step 723 closes the license file in the same way as Step 716 and ends this flow assuming that there is no available license to be issued.

As mentioned above, according to the present invention, when the distribution of an application registered in a server computer is requested at the start of an application in a client computer, even when the application is updated, that is, modified, a latest application can be automatically set up in the client computer remotely from the server computer.

Furthermore, a user is released from necessity of seizing of a computer beforehand to which the target application is distributed and the user can devote himself to his own application without taking account of the status of the computer system.

The invention claimed is:

1. An application execution method in a system for distributing an application program to a client computer from a server computer via a transmission line and executing said program by said client computer, comprising:

the process by said client computer comprising;
   a step of sending to said server computer a down load request of at least one file among files stored in a file system of said server computer and receiving a down load of said request file from said server computer;
   a step of deciding said down-loaded file;
   a step of analyzing said down-loaded request when said down-loaded file agrees with said request file as a result of said decision;
   a step of deciding an execution file of an application to be started which is described in said request file on the basis of said analyzed result; and
   a step of notifying a distribution request for said execution file of said application to said server computer;

the process by said server computer comprising;
   a step of deciding a command relating to said distribution request received from said client computer;
   a step of deciding whether said application whose distribution is requested is licensed in said client computer or not; and
   a step of setting up said application in said client computer when said application is licensed as a result of said decision.

2. An application execution method according to claim 1, wherein said step of deciding an execution file further comprises;
   a step of deciding a name of said execution file of said application at the same time as said decision.

3. An application execution method according to claim 1, wherein said step of notifying a distribution request to said server computer further comprises;
   a step of notifying a distribution request instruction set to said server computer on the basis of a reply from said server computer at the same time as said notification of said distribution request.

4. An application execution method according to claim 1, wherein said step of deciding whether said application is licensed or not further comprises;

a step of deciding whether said application whose distribution is requested is set up in said server computer or not.

5. An application execution method in a system for distributing an application program to a client computer from a server computer via a transmission line and executing said program by said client computer, comprising:

the process by said client computer comprising;

a step of reading file information constituting an application to be started;

a step of deciding an execution file of said application to be started on the basis of said constitution file information;

a step of deciding whether said application is set up in said client computer or not on the basis of said execution file; and a step of setting distribution request information of said application when said application is not set up as a result of said decision and notifying said distribution request information to said server computer;

the process by said server computer comprising;

a step of deciding an execution file of an application which is an object of distribution request from said distribution request information notified from said client computer;

a step of deciding whether said decided execution file is registered in application registration information for managing an application registered in said server computer or not on the basis of said execution file; and a step of distributing a file constituting an application to said client computer when said client computer is registered in license information of said server computer and notifying said distribution result to said client computer from said server computer;

the process by said client computer further comprising;

a step of deciding whether said distribution is possible or impossible on the basis of said notified distribution result; and a step of displaying possibility or impossibility of distribution depending on said decision result on said client computer and starting said distributed application.

6. An application execution method in a system for distributing an application program to a client computer from a server computer via a transmission line and executing said program by said client computer, comprising:

the process by said client computer comprising;

a step of reading file information constituting an application to be started;

a step of deciding an execution file of said application to be started on the basis of said constitution file information; and a step of setting redistribution request information of said application when said execution file decided by said client computer is set up in said client computer and notifying said redistribution request information to said server computer;

the process by said server computer comprising;

a step of obtaining an execution file, date, and time of an application which is an object for redistribution request from said redistribution request information notified from said client computer;

a step of deciding whether said obtained execution file is registered in application registration information for managing an application registered in said server computer or not;

a step of comparing said obtained date and time with the date and time of an execution file of an application registered in said server computer when said execution file of said application which is an object for redistribution request is registered in said server computer as a result of said decision;

a step of distributing said application registered in said server computer to said client computer when said execution file of said application registered in said server computer is newer than said obtained file as a result of said comparison; and a step of notifying said distribution result to said client computer;

the process by said client computer further comprising;

a step of deciding whether said distribution is possible or impossible on the basis of said notified distribution result; and a step of displaying possibility or impossibility of distribution depending on said decision result on said client computer and starting said distributed application.

7. An application execution method in a system for distributing an application program to a client computer from a server computer via a transmission line and executing said program by said client computer, comprising:

the process by said client computer comprising;

a step of reading file information constituting an application to be started;

a step of deciding an execution file of said application to be started on the basis of said constitution file information;

a step of deciding whether said application is set up in said client computer or not on the basis of said execution file;

a step of setting distribution request information of said application when said application is not set up as a result of said decision and notifying said distribution request information to said server computer; and a step of setting redistribution request information of said application when said execution file decided by said client computer is set up in said client computer and notifying said redistribution request information to said server computer;

the process by said server computer comprising;

a step of deciding an execution file of an application which is an object of distribution request from said distribution request information notified from said client computer;

a step of deciding whether said decided execution file is registered in application registration information for managing an application registered in said server computer or not on the basis of said execution file;

a step of distributing a file constituting an application to said client computer when said client computer is registered in license information of said server computer and notifying said distribution result to said client computer from said server computer;

a step of deciding whether said obtained execution file is registered in application registration information for managing an application registered in said server computer or not;

a step of comparing said obtained date and time with the date and time of an execution file of an application registered in said server computer when said execution file of said application which is an object for redistribution request is registered in said server computer as a result of said decision;

a step of distributing said application registered in said server computer to said client computer when said execution file of said application registered in said server computer is newer than said obtained file as a result of said comparison; and a step of notifying said distribution result to said client computer;

the process by said client computer further comprising:

a step of deciding whether said distribution is possible or impossible on the basis of said notified distribution result; and a step of displaying possibility or impossibility of distribution depending on said decision result on said client computer and starting said distributed application.

8. An application execution method in a system for distributing an application program to a client computer from a server computer via a transmission line and executing said program by said client computer, comprising:

the licensing process by said server computer comprising;

a step of receiving an application distribution request and a distribution request instruction set from said client computer and deciding a command of said distribution request instruction set;

a step of deciding whether said command is a command for requesting distribution of an application newly when there is no distributed application in said client computer or a command for requesting a newest application when there is a distributed application;

a step of deciding whether the value obtained by subtracting the number of used licenses from the maximum number of licenses provided in the license file is 0 or at least 1 when new distribution is requested as a result of decision for said command;

a step of rejecting a new distribution request when the result of decision for said number of licenses is 0;

a step of setting the name and IP address of said client computer requesting distribution in said license file when the result of decision for said number of licenses is 1 or more;

a step of deciding whether the IP address of a license computer of a host list of a computer of said license file matches with said IP address of said client computer in said distribution request instruction first if said application is registered in an application registration file when newest distribution is requested as a result of decision for said command;

a step of comparing said IP address of said license computer of the maximum number of licenses provided in said license file with said IP address of said client computer in said distribution request instruction set sequentially when the result of decision for said IP address of said computer is a mismatch; and a step of comparing the date and time of an execution file registered in said application registration file with the data and time of an execution file of said distribution request instruction set when the result of decision for said IP address of said computer is a match.

9. An application execution system in a system for distributing an application program to a client computer from a server computer via a transmission line and executing said program by said client computer, comprising:

the processing system by said client computer comprising;

means for sending to said server computer a down load request of at least one file among files stored in a file system of said server computer and receiving a down load of said request file from said server computer;

means for deciding said down-loaded file;

means for analyzing said down-loaded request when said down-loaded file agrees with said request file as a result of said decision;

means for deciding an execution file of an application to be started which is described in said request file on the basis of said analyzed result; and means for notifying a distribution request for said execution file of said application to said server computer;

the processing system by said server computer comprising;

means for deciding a command relating to said distribution request received from said client computer;

means for deciding whether said application whose distribution is requested is licensed in said client computer or not; and means for setting up said application in said client computer when said application is licensed as a result of said decision.

10. An application execution system in a system for distributing an application program to a client computer from a server computer via a transmission line and executing said program by said client computer, comprising:

the processing system by said client computer comprising;

means for reading file information constituting an application to be started;

means for deciding an execution file of said application to be started on the basis of said constitution file information;

means for deciding whether said application is set up in said client computer or not on the basis of said execution file; and means for setting distribution request information of said application when said application is not set up as a result of said decision and notifying said distribution request information to said server computer;

the processing system by said server computer comprising;

means for deciding an execution file of an application which is an object of distribution request from said distribution request information notified from said client computer;

means for deciding whether said decided execution file is registered in application registration information for managing an application registered in said server computer or not on the basis of said execution file; and means for distributing a file constituting an application to said client computer when said client computer is registered in license information of said server computer and notifying said distribution result to said client computer from said server computer;

the processing system by said client computer further comprising;

means for deciding whether said distribution is possible or impossible on the basis of said notified distribution result; and means for displaying possibility or impossibility of distribution depending on said decision result on said client computer and starting said distributed application.

11. An application execution system in a system for distributing an application program to a client computer from a server computer via a transmission line and executing said program by said client computer, comprising:

the processing system by said client computer comprising;
means for reading file information constituting an application to be started;
means for deciding an execution file of said application to be started on the basis of said constitution file information; and
means for setting redistribution request information of said application when said execution file decided by said client computer is set up in said client computer and notifying said redistribution request information to said server computer;

the processing system by said server computer comprising;
means for obtaining an execution file, date, and time of an application which is an object for redistribution request from said redistribution request information notified from said client computer;
means for deciding whether said obtained execution file is registered in application registration information for managing an application registered in said server computer or not;
means for comparing said obtained date and time with the date and time of an execution file of an application registered in said server computer when said execution file of said application which is an object for redistribution request is registered in said server computer as a result of said decision;
means for distributing said application registered in said server computer to said client computer when said execution file of said application registered in said server computer is newer than said obtained file as a result of said comparison; and
means for notifying said distribution result to said client computer;

the processing system by said client computer further comprising;
means for deciding whether said distribution is possible or impossible on the basis of said notified distribution result; and
means for displaying possibility or impossibility of distribution depending on said decision result on said client computer and starting said distributed application.

12. An application execution system in a system for distributing an application program to a client computer from a server computer via a transmission line and executing said program by said client computer, comprising:

the processing system by said client computer comprising;
means for reading file information constituting an application to be started;
means for deciding an execution file of said application to be started on the basis of said constitution file information;
means for deciding whether said application is set up in said client computer or not on the basis of said execution file;
means for setting distribution request information of said application when said application is not set up as a result of said decision and notifying said distribution request information to said server computer; and
means for setting redistribution request information of said application when said execution file decided by said client computer is set up in said client computer and notifying said redistribution request information to said server computer;

the processing system by said server computer comprising;
means for deciding an execution file of an application which is an object of distribution request from said distribution request information notified from said client computer;
means for deciding whether said decided execution file is registered in application registration information for managing an application registered in said server computer or not on the basis of said execution file;
means for distributing a file constituting an application to said client computer when said client computer is registered in license information of said server computer and notifying said distribution result to said client computer from said server computer;
means for deciding whether said obtained execution file is registered in application registration information for managing an application registered in said server computer or not;
means for comparing said obtained date and time with the date and time of an execution file of an application registered in said server computer when said execution file of said application which is an object for redistribution request is registered in said server computer as a result of said decision;
means for distributing said application registered in said server computer to said client computer when said execution file of said application registered in said server computer is newer than said obtained file as a result of said comparison; and
means for notifying said distribution result to said client computer;

the processing system by said client computer further comprising;
means for deciding whether said distribution is possible or impossible on the basis of said notified distribution result; and
means for displaying possibility or impossibility of distribution depending on said decision result on said client computer and starting said distributed application.

13. An application execution system in a system for distributing an application program to a client computer from a server computer via a transmission line and executing said program by said client computer, comprising:

the licensing processing system by said server computer comprising;
means for receiving an application distribution request and a distribution request instruction set from said client computer and deciding a command of said distribution request instruction set;
means for deciding whether said command is a command for requesting distribution of an application newly when there is no distributed application in said client computer or a command for requesting a newest application when there is a distributed application;
means for deciding whether the value obtained by subtracting the number of used licenses from the maximum number of licenses provided in the license file is 0 or at least 1 when new distribution is requested as a result of decision for said command;
means for rejecting a new distribution request when the result of decision for said number of licenses is 0;

means for setting the name and IP address of said client computer requesting distribution in said license file when the result of decision for said number of licenses is 1 or more;

means for deciding whether the IP address of a license computer of a host list of a computer of said license file matches with said IP address of said client computer in said distribution request instruction first if said application is registered in an application registration file when newest distribution is requested as a result of decision for said command;

means for comparing said IP address of said license computer of the maximum number of licenses provided in said license file with said IP address of said client computer in said distribution request instruction set sequentially when the result of decision for said IP address of said computer is a mismatch; and means for comparing the date and time of an execution file registered in said application registration file with the data and time of an execution file of said distribution request instruction set when the result of decision for said IP address of said computer is a match.

* * * * *